(12) United States Patent
Reddy

(10) Patent No.: US 7,261,091 B2
(45) Date of Patent: Aug. 28, 2007

(54) CONTROL OF INDUCTION SYSTEM HYDROCARBON EMISSIONS

(75) Inventor: Sam R. Reddy, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/112,064

(22) Filed: Apr. 22, 2005

(65) Prior Publication Data

US 2006/0236984 A1 Oct. 26, 2006

(51) Int. Cl.
*F02M 25/06* (2006.01)
(52) U.S. Cl. ........................ 123/516; 123/572
(58) Field of Classification Search ........ 123/572–574, 123/516–520, 41.86
See application file for complete search history.

(56) References Cited

U.S. PATENT DOCUMENTS

| | | | | |
|---|---|---|---|---|
| 4,191,150 | A * | 3/1980 | Siewert | 123/572 |
| 4,422,416 | A * | 12/1983 | Bernardoni | 123/184.54 |
| 4,708,118 | A * | 11/1987 | Rawlings | 123/555 |
| 6,422,191 | B1* | 7/2002 | Braun et al. | 123/184.21 |
| 6,679,228 | B1* | 1/2004 | Confer et al. | 123/519 |
| 6,832,603 | B2* | 12/2004 | Knollmayr | 123/572 |
| 2003/0150436 | A1* | 8/2003 | Stegmaier et al. | 123/572 |
| 2003/0192512 | A1* | 10/2003 | Luley et al. | 123/519 |
| 2005/0022795 | A1* | 2/2005 | Beyer et al. | 123/516 |

* cited by examiner

*Primary Examiner*—Marguerite McMahon

(57) ABSTRACT

A method and apparatus for reducing or preventing hydrocarbon emissions from an air induction system of an automotive vehicle directs hydrocarbon from induction system into the crankcase when the vehicle is not in operation.

15 Claims, 3 Drawing Sheets

US 7,261,091 B2

CONTROL OF INDUCTION SYSTEM HYDROCARBON EMISSIONS

FIELD OF THE INVENTION

The present invention relates generally to systems and methods for controlling hydrocarbon emissions in automotive vehicles.

BACKGROUND OF THE INVENTION

The automotive industry has actively sought improved emissions reduction, including reduction in emissions due to gasoline evaporation. Gasoline includes a mixture of hydrocarbons ranging from higher volatility butanes ($C_4$) to lower volatility $C_8$ to $C_{10}$ hydrocarbons. When vapor pressure increases in the fuel tank due to conditions such as higher ambient temperature or displacement of vapor during filling of the tank, fuel vapor may flow through openings in the fuel tank and escape into the atmosphere. To prevent fuel vapor loss into the atmosphere, the fuel tank is vented into a canister called an "evap canister" that contains an adsorbent material such as activated carbon granules. As the fuel vapor enters an inlet of the canister, the fuel vapor diffuses into the carbon granules and is temporarily adsorbed. The size of the canister and the volume of the adsorbent material are selected to accommodate the expected fuel vapor generation. One exemplary evaporative control system is described in U.S. Pat. No. 6,279,548 to Reddy, which is hereby incorporated by reference.

Evaporative emission control systems have advanced to the point where vehicle induction system or air intake system hydrocarbon emissions account for a significant portion of remaining hydrocarbon emissions. Intake system hydrocarbon emissions may arise from diffusion of a small amount of fuel left in fuel injectors after engine shut down or from liquid fuel wetting the walls of the intake manifold. Hydrocarbon traps containing an adsorbent such as activated carbon may be added to the air intake to absorb such emissions, which may then be desorbed by engine intake air when the engine is operating, but would add cost and complexity to manufacture of the vehicle. A less costly but still effective way to eliminate or reduce the emissions would be desirable.

SUMMARY OF THE INVENTION

In an embodiment of the invention, a method for reducing or preventing hydrocarbon emissions of residual hydrocarbons in an air induction system when an automotive vehicle is not in operation directs residual hydrocarbon (present as vapor, liquid, or both) in the vehicle air induction system into the engine oil crankcase. The crankcase retains the hydrocarbon, and the engine oil may absorb such low amounts of hydrocarbon without detriment.

In an embodiment of the invention, an apparatus for reducing or eliminating emissions of residual hydrocarbon present in an automotive vehicle air induction system when the vehicle is not in operation includes a vent or other opening located in an underside portion of the air induction system, an orifice or other opening in an engine oil crankcase, and a hollow connector between the vent and the orifice. The vent and orifice are opened when the vehicle is not in operation to allow any hydrocarbon in the air induction system to be introduced into the crankcase through the connector.

In an embodiment of the invention, an induction hydrocarbon emission control system for an internal combustion engine having an air induction system connecting to engine cylinders, fuel injectors located in the air induction system positioned to inject fuel into intake ports, and a crankcase containing engine oil to lubricate a piston in the cylinder, the crankcase having a vent, includes a throttle valve located in the air induction system and a connective pathway from an underside outlet of the air induction system, the outlet being located between the throttle valve and the intake ports, to the crankcase vent.

The invention further provides a method for reducing or preventing hydrocarbon emissions of residual hydrocarbons in a portion of an air intake system for an engine having a crankcase containing engine oil, in which, when the engine is not operating, the portion of the air induction system is vented into the crankcase.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
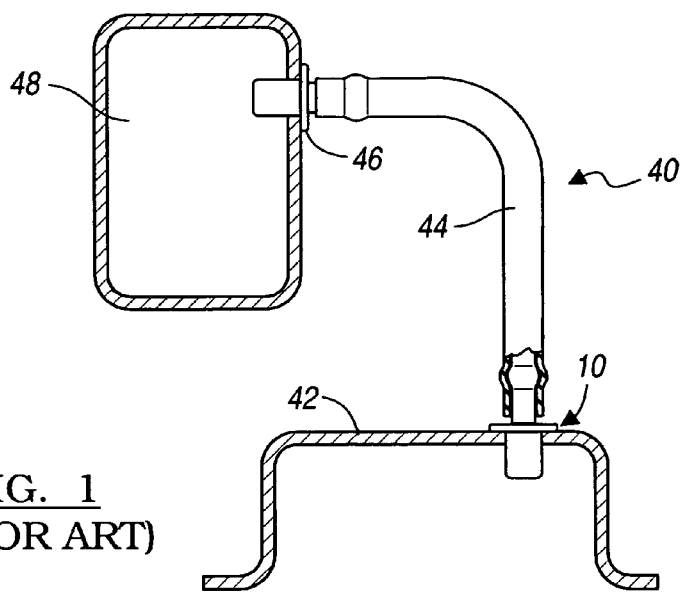
FIG. 1 is a schematic diagram of a prior art engine positive crankcase ventilation (PCV) system.

Positive crankcase ventilation (PCV) systems reduce emission of contaminants by recirculating blowby gases and crankcase vapors into the engine cylinders for burning. During operation of an automotive vehicle with an internal combustion engine, crankcase vapors are drawn through a liquid separator and into the air intake manifold (a part of the air induction system) where they will be drawn into the cylinders by intake manifold vacuum. FIG. 1 schematically illustrates a prior art design of a positive crankcase ventilation orifice. In FIG. 1, PCV orifice 10 in engine PCV system 40 is mounted in an oil separation portion 42 of a cylinder head cam cover of the crankcase. The orifice 10 connects directly with a PCV hose 44 that leads to a fitting 46 on the engine intake manifold 48 for recirculating blowby and crankcase vapors into the engine cylinders, not shown, to which the intake manifold connects.

Figure 2:
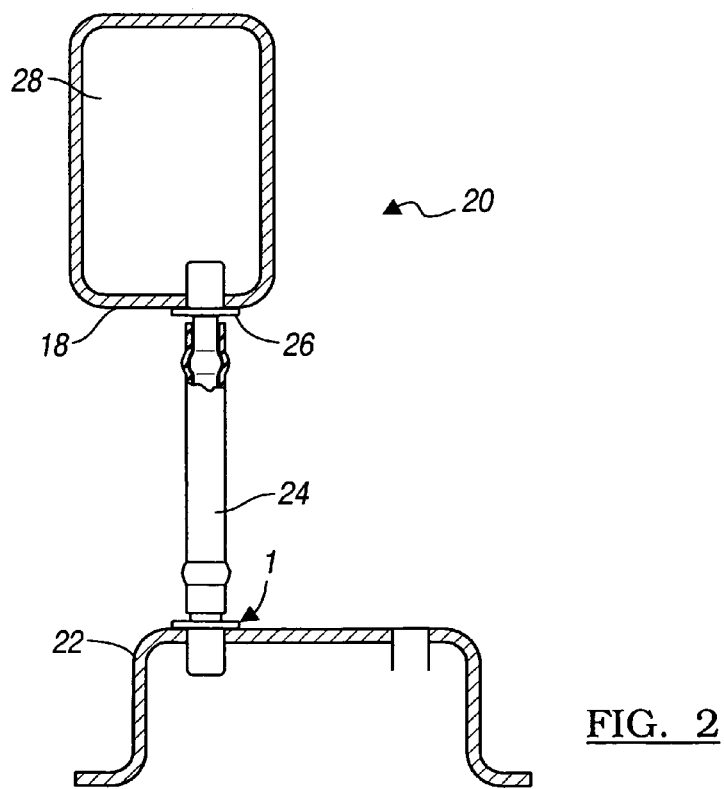
FIG. 2 is a schematic diagram of an induction system hydrocarbon emission control system according to the invention.

FIG. 2 schematically illustrates a positive crankcase ventilation (PCV) system in an embodiment of the induction system hydrocarbon emission control system according to the invention. In FIG. 2, PCV orifice 1 in engine PCV system 20 is mounted in oil separation portion 22 of a cylinder head cam cover. The orifice 1 connects directly with a PCV hose 24 to a fitting 26 on a bottom portion 18 of engine intake manifold 28. During engine operation the PCV system operates as before for recirculating blowby and crankcase vapors into the engine cylinders to be incinerated. When the engine is not in operation, hydrocarbon vapor that is present in the air induction system is heavier than air and sinks to the bottom of manifold 28, where it can pass through hose 24 into the cylinder head and crankcase.

FIG. 2 shows a flat bottom 18, but bottom 18 may also be shaped to help direct hydrocarbon vapor or liquid into hose 24. For example, bottom 18 may have a funnel shape or other depression 77, as shown in FIG. 3, around fitting 26 that would encourage passage of hydrocarbon into hose 24 and from there into the crankcase.

Figure 3:
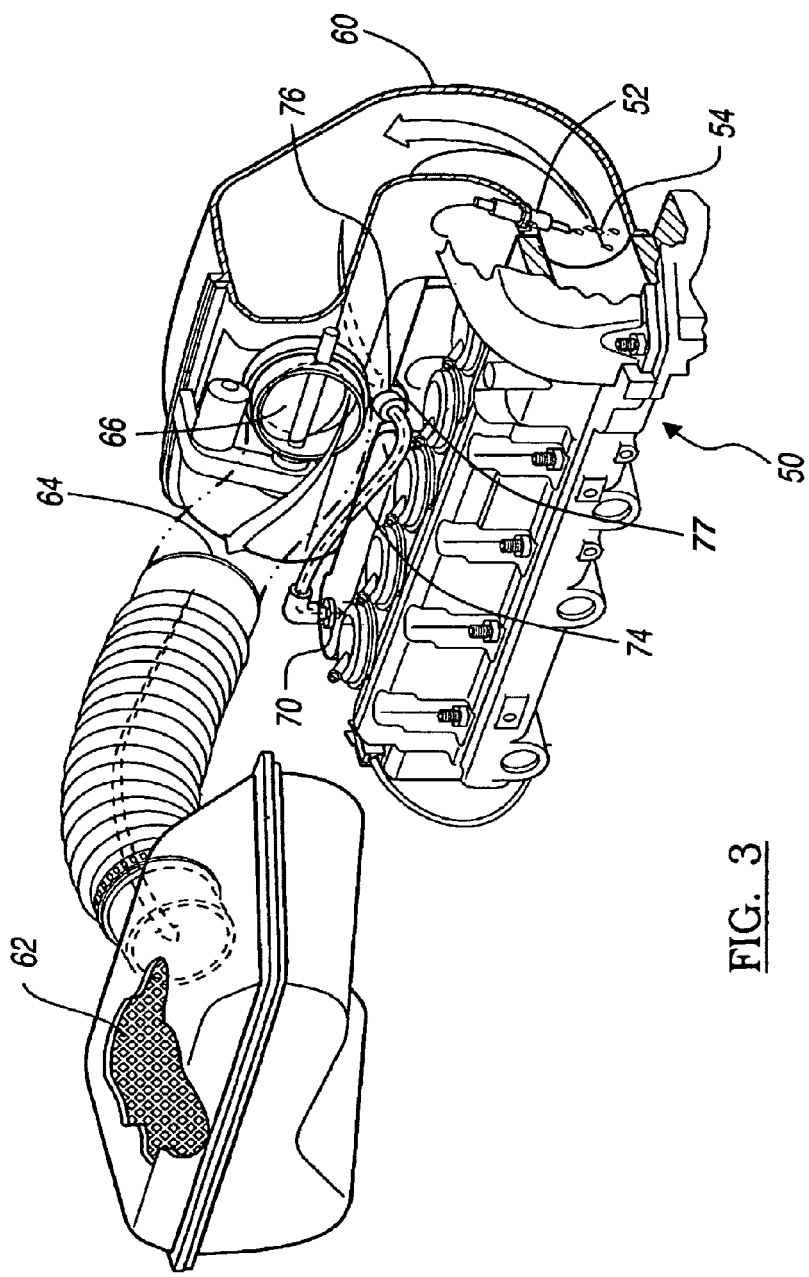
FIG. 3 is a partially cut-away perspective view of an engine and hydrocarbon emission control system for a vehicle according to the invention.

The cut-away diagram of FIG. 3 further illustrates the invention as an embodiment of an engine and induction hydrocarbon emission control system for a vehicle. The engine 50 has an intake manifold 60 located near PCV orifice 70. Intake manifold 60 receives air drawn through air filter 62 and air induction hose 64 into opening 66. Hose 64 is shown detached from opening 66 for simplification. A bottom section of the intake manifold 60 close to PCV orifice 70 has a vent 76, connected through PCV hose 74 to PCV orifice 70. During engine operation, fuel injector 52 injects fuel (hydrocarbon) into an engine cylinder. When the engine is not operating, the hydrocarbon of the fuel may drip from the injector and vaporize in intake manifold 60. Fuel vapor may also wet the wall of intake manifold 60 or other parts of the air induction system, represented by hydrocarbon drops 54. If the hydrocarbon remains in the air induction system, it may be lost (e.g., through air cleaner 62) as undesirable emissions. The hydrocarbon is re-directed into the engine crankcase to capture the hydrocarbon and prevent its emission from the engine 50.

Figure 4:
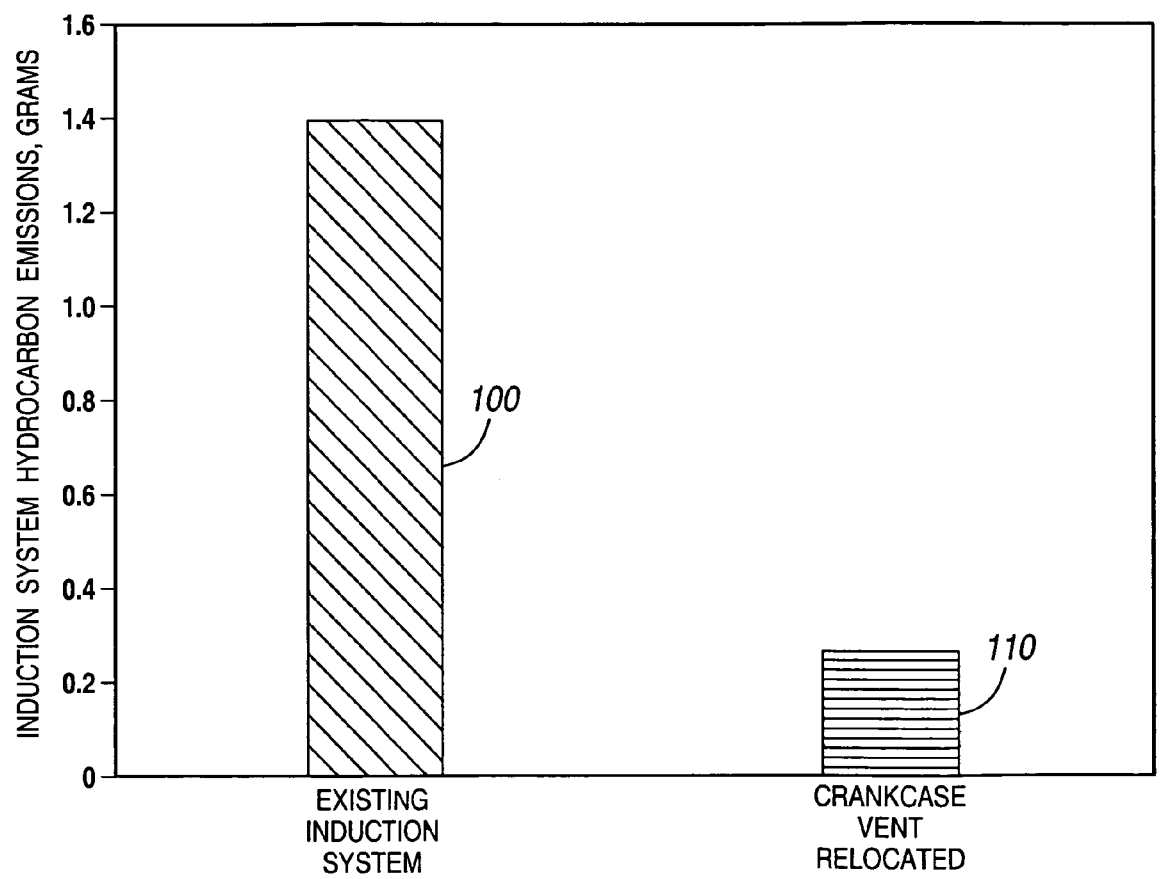
FIG. 4 is a graph illustrating measured hydrocarbon emissions for a simulated air induction system.

Results of a test simulating fuel vaporization using butane gas injection into an air intake manifold with and without the relocated crankcase vent according to the invention are represented by the graph of FIG. 4. Bar 100 represents a measured hydrocarbon loss (in grams) for an existing air induction system of 1.4 grams of hydrocarbon, while bar 110 represents a reduction to a loss of 0.3 grams of hydrocarbon under the same conditions with a modified air induction system according to the invention as illustrated by FIG. 3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for reducing or preventing hydrocarbon emissions from an air induction system of an automotive vehicle, said air induction system comprising an intake manifold having a plenum, said plenum having a depression on a bottom portion connecting to an engine oil crankcase, the method comprising
    directing hydrocarbon in the air induction system via the depression on the bottom portion of the plenum into the crankcase when the vehicle is not in operation.

2. A method according to claim 1, wherein the hydrocarbon is directed through a vent in the air induction system into the crankcase.

3. A method according to claim 2, wherein the vent is located at an underside point of the air induction system.

4. A method according to claim 2, wherein a throttle valve located in the air induction system is closed when the vehicle is not in operation and further wherein the vent in the air induction system is located between the throttle valve and the engine.

5. A method according to claim 1, wherein the hydrocarbon is directed generally downward from the air induction system into the crankcase.

6. A method according to claim 1, wherein the depression has a funnel shape.

7. In an automotive vehicle comprising an internal combustion engine having an air induction system and an engine oil crankcase, an apparatus for reducing or eliminating hydrocarbon emissions from the air induction system comprising an intake manifold having a plenum when the vehicle is not in operation, comprising the air induction system, the engine oil crankcase, and a hollow connector connecting a vent located in a depression on an underside portion of the air intake manifold plenum to an orifice into the engine oil crankcase.

8. An apparatus according to claim 7, wherein the orifice is a positive crankcase ventilation orifice.

9. An apparatus according to claim 7, wherein the hollow connector is in a generally downward position leading from vent to orifice.

10. An automotive vehicle comprising the apparatus of claim 7.

11. An apparatus according to claim 7, wherein the depression has a funnel shape.

12. An evaporative emission control system for an internal combustion engine, comprising an air induction system comprising an intake manifold having a plenum connecting to cylinders of the engine, a fuel injector located in the air induction system, said fuel injector being positioned to inject fuel into an intake port, a crankcase containing engine oil that lubricates a piston in the cylinder, said crankcase having a vent, and a connective pathway between a depression at an underside outlet in the air intake manifold plenum and the crankcase vent.

13. An evaporative emission control system according to claim 12, further including a throttle valve located in the air induction system, wherein the underside outlet is located between the throttle valve and the cylinder.

14. An induction hydrocarbon emission control system according to claim 12, comprising a positive crankcase ventilation system that comprises the crankcase vent.

15. An induction hydrocarbon emission control system according to claim 12, wherein the depression has a funnel shape.

* * * * *